United States Patent
Jacobi et al.

(10) Patent No.: US 8,417,890 B2
(45) Date of Patent: Apr. 9, 2013

(54) MANAGING CACHE COHERENCY FOR SELF-MODIFYING CODE IN AN OUT-OF-ORDER EXECUTION SYSTEM

(75) Inventors: Christian Jacobi, Schonaich (DE); Brian R. Prasky, Wappingers Falls, NY (US); Aaron Tsai, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 113 days.

(21) Appl. No.: 12/797,015

(22) Filed: Jun. 9, 2010

(65) Prior Publication Data
US 2011/0307662 A1    Dec. 15, 2011

(51) Int. Cl.
*G06F 12/00* (2006.01)

(52) U.S. Cl.
USPC ........... 711/125; 711/123; 711/126; 711/141; 711/118; 711/119

(58) Field of Classification Search .......................... None
See application file for complete search history.

(56) References Cited

U.S. PATENT DOCUMENTS 6,865,645 B1 * 3/2005 Shum et al. .................... 711/123

OTHER PUBLICATIONS

IBM: "z/Architecture Principles of Operation", Publication No. SA22-7832-07; Eighth Edition, Feb. 2009.
Bohizic, et al., "Executing Atomic Store Disjoint Instructions", U.S. Appl. No. 12/708,257, filed Feb. 28, 2010.
Jacobi, et al., "Load Pair Disjoint Facility and Instruction Therefore", U.S. Appl. No. 12/708,824, filed Feb. 18, 2010.

* cited by examiner

*Primary Examiner* — Christian P Chace
*Assistant Examiner* — Alan Otto
(74) *Attorney, Agent, or Firm* — Fleit Gibbons Gutman Bongini & Bianco PL; Thomas Grzesik

(57) ABSTRACT

A method, system, and computer program product for managing cache coherency for self-modifying code in an out-of-order execution system are disclosed. A program-store-compare (PSC) tracking manager identifies a set of addresses of pending instructions in an address table that match an address requested to be invalidated by a cache invalidation request. The PSC tracking manager receives a fetch address register identifier associated with a fetch address register for the cache invalidation request. The fetch address register is associated with the set of addresses and is a PSC tracking resource reserved by a load store unit (LSU) to monitor an exclusive fetch for a cache line in a high level cache. The PSC tracking manager determines that the set of entries in an instruction line address table associated with the set of addresses is invalid and instructs the LSU to free the fetch address register.

20 Claims, 6 Drawing Sheets

MANAGING CACHE COHERENCY FOR SELF-MODIFYING CODE IN AN OUT-OF-ORDER EXECUTION SYSTEM

FIELD OF THE INVENTION

The present invention generally relates to the field of microprocessor design, and more particularly relates to managing cache coherency for self-modifying code in an out-of-order execution system.

BACKGROUND OF THE INVENTION

Self-modifying code presents a special problem to modern microprocessors that utilize separate instruction and data caches. In this design, the data cache lacks the necessary information to determine whether or not data that is modified affects instruction storage, and thus whether prefetched instructions need to be discarded. Special interlocks between the data cache and the instruction cache can be designed to detect whether prefetched instructions should be discarded due to modified store results.

The interlocks utilized by processors to detect when a program is storing into its instruction stream are known as "program-store-compare" (PSC). In an architecture that allows self-modifying code, such as the IBM System/Z processors, this can be a very important logic path, as any store could cause the processor to discard prefetched instructions.

Conventional designs have implemented PSC by assuming that most speculative store execution to lines are resolved in a timely manner with a flush after a store completion to that line. As a result, if there is no store completion to that line within some relatively short arbitrary time period, the processor assumes that there could be some future store completion to that line and flushes the pipe at that time to free PSC tracking resources.

In an out-of-order execution design, in many cases there may be a long delay between any speculative store execution to a line and the first store completion to that line. With out-of-order branch resolution, it is also possible for a storing instruction that initiates PSC tracking to be down an incorrect branch path and be flushed without the knowledge of the tracking logic, in which case the tracking logic may continue to track without ever seeing a store completion to that line. Flushing the pipe in a relatively short arbitrary amount of time in order to free PSC tracking resources can cause unnecessary multiple premature pipe flushes for a single PSC event and result in poor performance. Flushing the pipe in a relatively long amount of time (or not forcing a flush at all) can cause PSC tracking resources to be reserved longer than necessary. This results in poor performance due to pipe stalls waiting for PSC tracking resources, or can even result in potential processor hang scenarios with PSC tracking resources never getting freed.

SUMMARY OF THE INVENTION

In one embodiment, a method for managing cache coherency for self-modifying code in an out-of-order execution system is disclosed. The method comprises identifying, by a program-store-compare (PSC) tracking manager, a set of addresses of pending instructions in an address table that match an address requested to be invalidated by a cache invalidation request. The PSC tracking manager receives from an instruction cache a fetch address register identifier associated with a fetch address register for the cache invalidation request. The fetch address register is associated with the set of addresses and being a PSC tracking resource reserved by a load store unit (LSU) to monitor an exclusive fetch for a cache line in a high level cache. The PSC tracking manager determines that the set of entries in an instruction line address table associated with the set of addresses is one of valid and invalid. The PSC tracking manager instructs the LSU to free the fetch address register in response to determining that the set of entries is invalid.

In another embodiment, a system for managing cache coherency for self-modifying code in an out-of-order execution system is disclosed. The system comprises a memory and a processor that is communicatively coupled to the memory. The processor comprises a program-store-compare (PSC) tracking manager that is configured to perform a method. The method comprises identifying a set of addresses of pending instructions in an address table that match an address requested to be invalidated by a cache invalidation request. The PSC tracking manager receives from an instruction cache a fetch address register identifier associated with a fetch address register for the cache invalidation request. The fetch address register is associated with the set of addresses and being a PSC tracking resource reserved by a load store unit (LSU) to monitor an exclusive fetch for a cache line in a high level cache. The PSC tracking manager determines that the set of entries in an instruction line address table associated with the set of addresses is one of valid and invalid. The PSC tracking manager instructs the LSU to free the fetch address register in response to determining that the set of entries is invalid.

In yet another embodiment, a computer program product for managing cache coherency for self-modifying code in an out-of-order execution system is disclosed. The computer program product comprises a storage medium readable by a processing circuit and storing instructions for execution by the processing circuit for performing a method. The method comprises identifying, by a program-store-compare (PSC) tracking manager, a set of addresses of pending instructions in an address table that match an address requested to be invalidated by a cache invalidation request. The PSC tracking manager receives from an instruction cache a fetch address register identifier associated with a fetch address register for the cache invalidation request. The fetch address register is associated with the set of addresses and being a PSC tracking resource reserved by a load store unit (LSU) to monitor an exclusive fetch for a cache line in a high level cache. The PSC tracking manager determines that the set of entries in an instruction line address table associated with the set of addresses is one of valid and invalid. The PSC tracking manager instructs the LSU to free the fetch address register in response to determining that the set of entries is invalid.

DETAILED DESCRIPTION

Various embodiments of the present invention will be discussed in detail hereinbelow with reference to the attached drawings.

One of the advantages of embodiments of the present invention is that the arbitrary method of forcing flushes to free PSC tracking resources based on time or the timing of events unrelated to PSC resolution is eliminated. In embodiments of the present invention, the ICache and IFetch logic is configured to send information to the load-store-unit (LSU) about the existence (or lack of existence) of instructions in the pipeline that were fetched from the line where PSC was detected. The LSU only needs to continue to track PSC and reserve the tracking resources as long as the IFetch informs the LSU that instructions from this line are still in the pipeline. When all of the instructions from this line are removed from the pipeline (either by instruction completion or pipeline flush, or a combination of both) the LSU no longer needs to track PSC for this line and can free its tracking resource.

Figure 1:
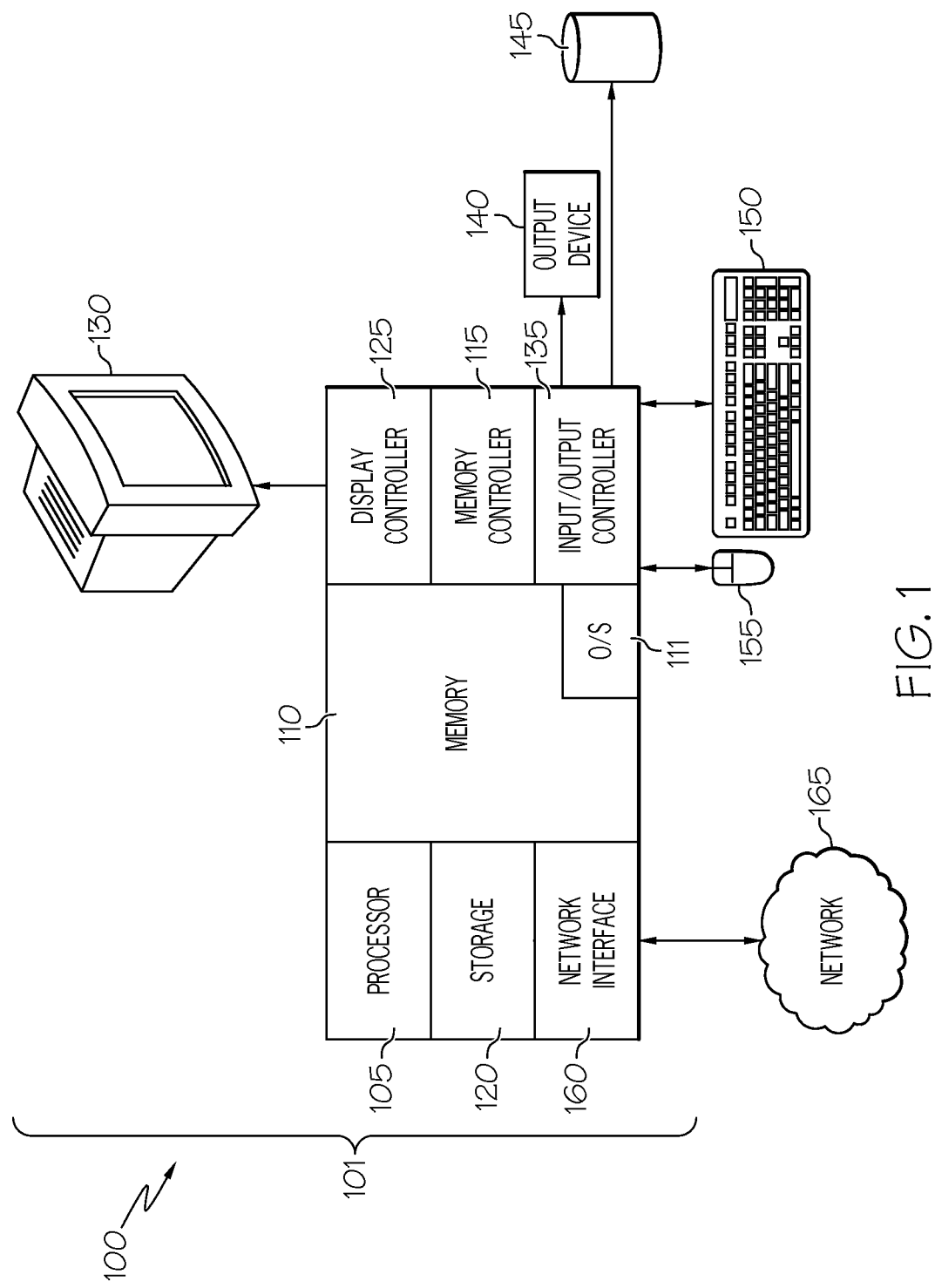
FIG. 1 is a block diagram illustrating an operating environment according to one embodiment of the present invention.

FIG. 1 shows an operating environment according to one embodiment of the present invention. In particular, FIG. 1 shows an exemplary system 100 that implements program-store-compare (PSC) processes of one embodiment of the present invention. In general, the processes discussed herein can be implemented in hardware, software (e.g., firmware), or a combination thereof. In one embodiment, the processes discussed herein are implemented in hardware, and are part of the microprocessor of a special or general-purpose digital computer, such as a personal computer, workstation, minicomputer, or mainframe computer. The exemplary system 100 therefore includes general-purpose computer 101.

In this embodiment, in terms of hardware architecture, the computer 101 includes one or more processors 105, memory 110 coupled to a memory controller 115, and one or more input and/or output (I/O) devices 140 and 145 (or peripherals) that are communicatively coupled via a local input/output controller 135. The input/output controller 135 can be, but is not limited to, one or more buses or other wired or wireless connections. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor can include one or more units, such as instruction fetch units (IFUs), fixed-point execution units (FXUs), branch resolution units (BRUs), and floating point units (FPUs), among other units. In this embodiment, the PSC processes are part of the processor 105.

An instruction can transition through stages of: fetching, dispatching, execution, and retirement. Fetching acquires an instruction from memory, most likely through a local cache, such as an instruction cache. Dispatching controls when the instruction is sent to an execution unit. Execution can be performed in different units depending upon the type of instruction (e.g., fixed point versus floating point). The instruction can complete execution in one cycle or in multiple cycles, again depending upon the instruction type. Upon execution completion, put away (storage) may be performed to update certain registers or memory storage (including the processor's local cache). The instruction is retired at the end of an operation, making any final changes to the state of the processor 105 and performing instruction checkpointing to capture a known good state of the processor 105.

The memory 110 can include any one or combination of volatile memory elements (e.g., random access memory such as DRAM, SRAM, and SDRAM) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, and cassette). Moreover, the memory 110 may incorporate electronic, magnetic, optical, and/or other types of storage media. The memory 110 can have a distributed architecture in which various components are situated remote from one another but can be accessed by the processor 105.

The instructions in memory 110 can include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In this embodiment, a conventional keyboard 150 and mouse 155 are coupled to the input/output controller 135. Other output devices such as the I/O devices 140 and 145 can include input devices, such as a printer, a scanner, a microphone, and the like. Finally, the I/O devices 140 and 145 can further include devices that communicate both inputs and outputs, for instance a network interface card (NIC) or modulator/demodulator (for accessing other files, devices, systems, or a network), a radio frequency (RF) or other transceiver, a telephonic interface, a bridge, a router, and the like.

The system 100 further comprises a display controller 125 coupled to a display 130. In this embodiment, the system 100 further includes a network interface 160 for coupling to a network 165. The network 165 can be an IP-based network for communication between the computer 101 and any external server, client, and the like via a broadband connection. The network 165 transmits and receives data between the computer 101 and external systems. In this embodiment, network 165 is a managed IP network administered by a service provider. The network 165 can be implemented in a wireless fashion (e.g., using wireless protocols and technologies, such as WiFi, WiMax, etc). The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a personal computer, workstation, intelligent device or the like, the instructions in the memory 110 can further include a basic input output system (BIOS).

The BIOS is a set of essential routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions.

In this embodiment in which the PSC processes are implemented in hardware, the PSC processes are implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
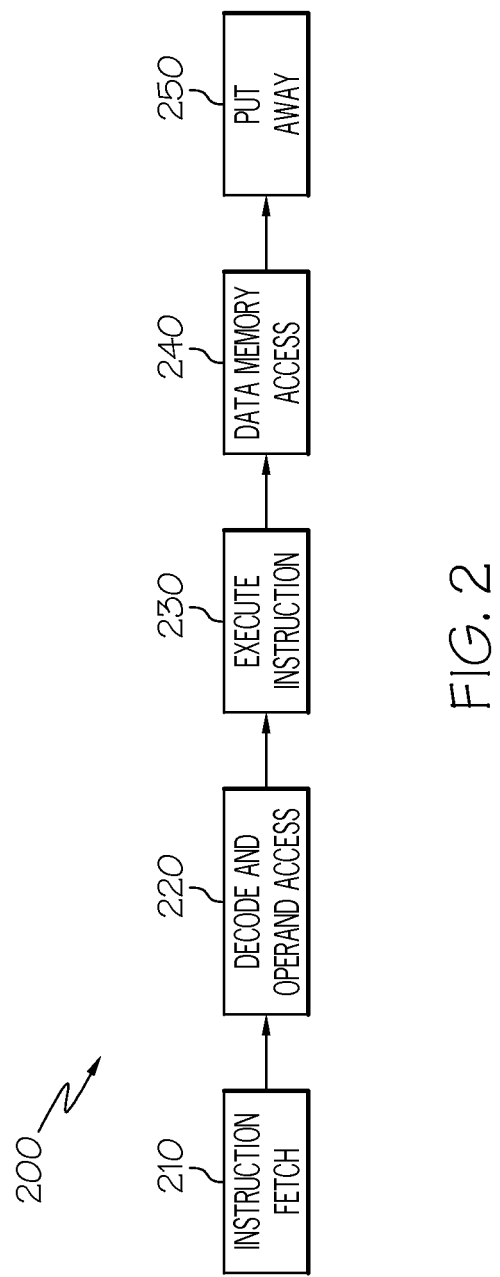
FIG. 2 illustrates a pipeline used in a program store compare process according to one embodiment of the present invention.

FIG. 2 illustrates an exemplary processor instruction pipeline system in which the PSC processes of one embodiment of the present invention are implemented. The simplest way to speed up the processor operation is to pipeline it. Pipelining is one specific form of parallelism in which the execution of several instructions is interleaved on the same hardware. In the illustrated embodiment, the pipeline system 200 includes five stages: (1) Instruction fetch 210; (2) Decode and operand access 220; (3) Execute instruction 230; (4) Data memory access 240; and (5) Put Away 250. In this embodiment, the instruction fetch 210 stage fetches an instruction to be processed. The Decode and operand access 220 stage decodes the instruction and gathers the source operands needed by the instruction being processed. The Execute instruction 230 stage performs the function of the instruction that can include arithmetic logic unit (ALU) operations. The Data memory access 240 stage performs any data memory access functions associated with the instruction. The Put Away 250 stage writes the appropriate result value into the register file. The pipeline system 200 can be enhanced by the PSC by eliminating a direct PSC indication (e.g., PSC bus) between a data cache and an instruction cache, so that a higher level cache maintains information about lower level cache inclusivity and uses a variation of an existing cache invalidation process for handling PSC functions.

It should be noted that for processors that support virtual addressing, the LSU fetch address and address registers, coherency logic, and I-cache or I-fetch instruction address table may be either virtual or real/absolute addresses depending on the requirements of the software architecture for self-modifying code. Also, even though virtual addressing support is not discussed in detail, various embodiments of the present invention are also applicable to virtual addressing as well.

Figure 3:
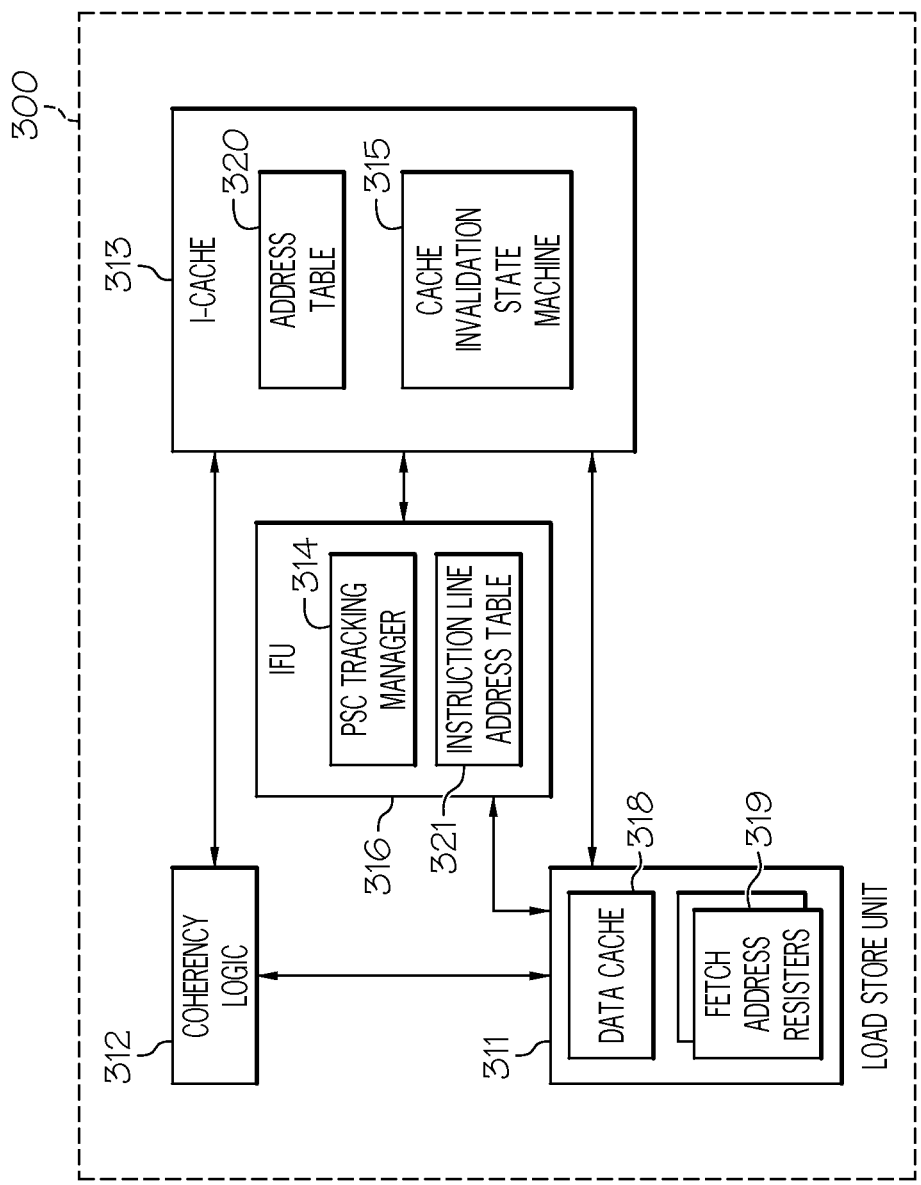
FIG. 3 is a block diagram illustrating components for implementing program store compare processes according to one embodiment of the present invention.
Figure 4:
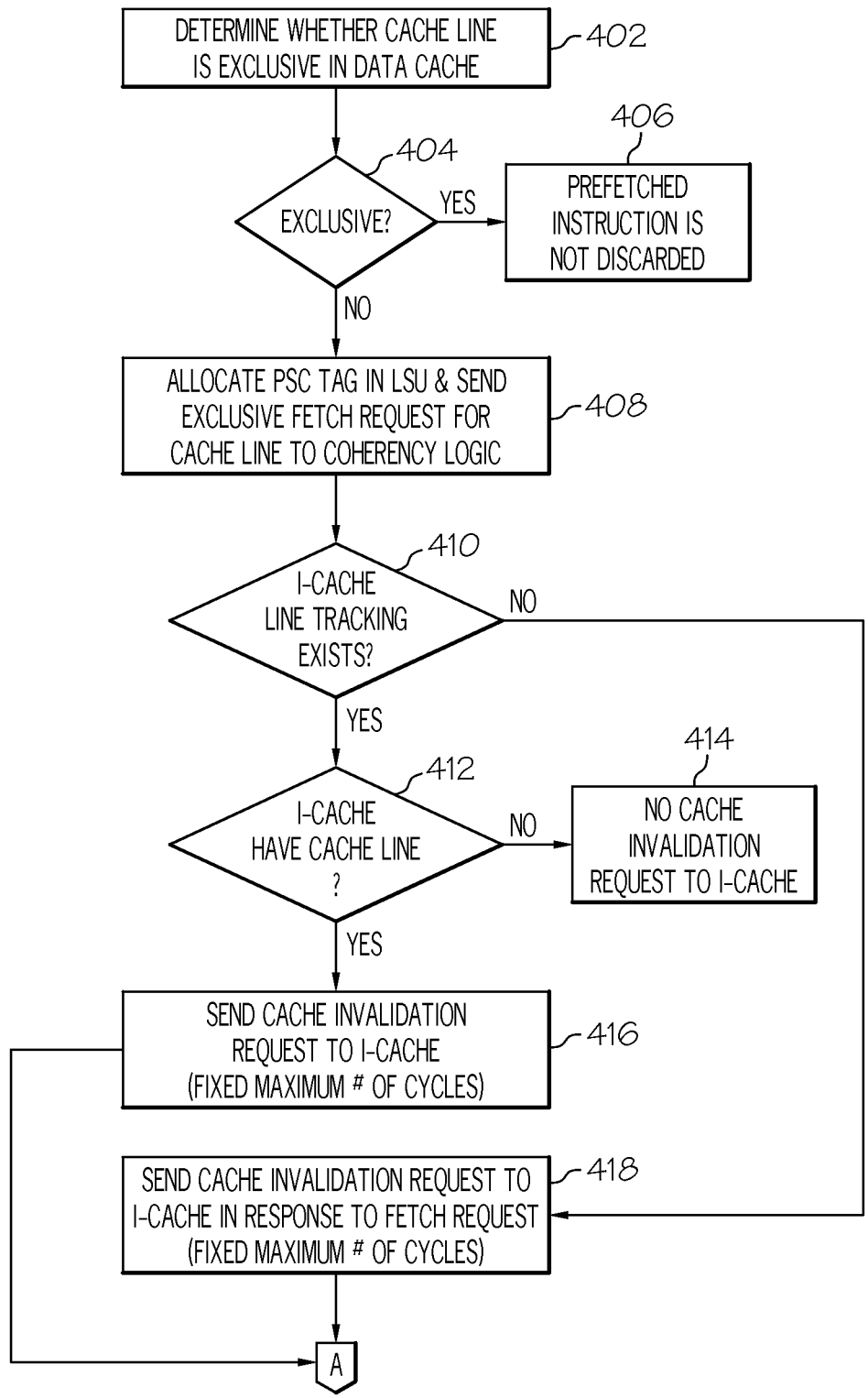
FIGS. 4 and 5 are operational flow diagrams illustrating program store compare processes according to one embodiment of the present invention.
Figure 5:
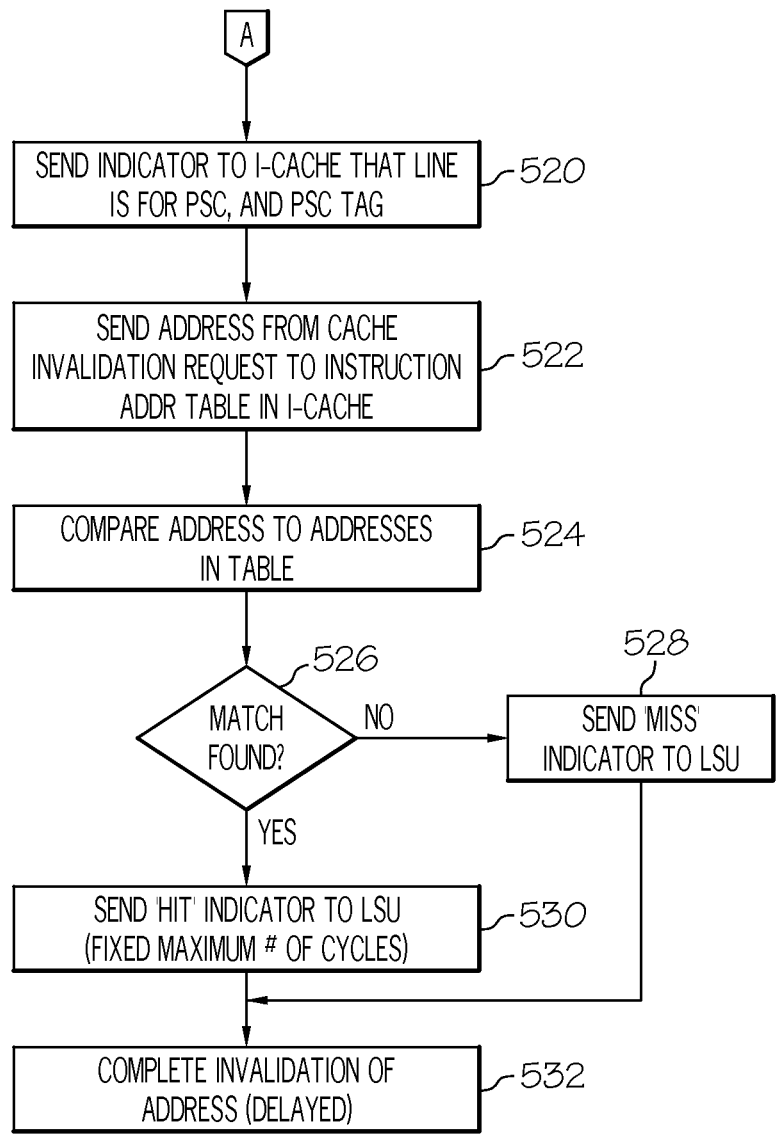

FIG. 3 is a block diagram illustrating components for implementing PSC processes according to one embodiment of the present invention, and FIGS. 4 and 5 are flow diagrams describing these processes. As explained above, the PSC components 300 form a portion of the processor in some embodiments. The PSC components 300 of FIG. 3 include a load-store unit (LSU) 311, an instruction cache (I-cache) 313, coherency logic 312, and a PSC tracking manager 314, which resides in an IFetch unit (IFU) 316. In this embodiment, the coherency logic 312 can be implemented by a higher level cache, such as a level 2 (L2) cache. The LSU 311 is responsible for executing store instructions and operand data loads, the instruction cache 313 handles fetching instructions, and the coherency logic 312 sends cache invalidation requests to the instruction cache 313. The IFU 316 prefetches instructions and can include speculative loading and branch prediction capabilities, and also maintains an instruction line address table 321. When the IFU 316 wants to fetch an instruction to a new line, the IFU 316 assigns an entry such as an IA Register or IAReg entry in the instruction line address table 321.

The PSC tracking manager 314 informs the LSU 311 as to whether or not to continue tracking PSC for a given line. The instruction cache 313 maintains an instruction address table 320 containing addresses of instructions that have been fetched by the processor (e.g., processor 105 of FIG. 1). The instruction cache 313 also maintains a cache invalidation state machine 315. These components 300 are in communication with a data cache 318. In one embodiment, the data cache 318 is incorporated within the LSU 311.

When processing a store instruction, the LSU 311 checks to see if the store target cache line is already exclusive in the data cache 318, at step 402. If it is determined to be exclusive at step 404, then prefetched instructions do not need to be discarded, at step 406. This is because the cache line cannot be in the instruction cache, and thus cannot be part of any prefetched instructions, as the only cache in which the line is present is the data cache 318. If, however, the cache line is not exclusive in the data cache 318, a tag (or "PSC tag") is allocated in the LSU 311, at step 408. In this exemplary embodiment, this PSC tag includes a fetch address register (FAR) ID of a fetch address register 319 that is used to track the exclusive fetch in a higher level cache (e.g., L2 or main memory). The PSC tag is sent to the coherency logic 312 along with the exclusive fetch for the cache line.

The coherency logic 312 tracks whether or not a cache line has been fetched by the instruction cache 313, and has since not been invalidated, at step 412. If the coherency logic 312 does such tracking (step 410), then the coherency logic 312 sends a cache invalidation request (PSC XI) to the instruction cache 313 only if the instruction cache 313 is considered to still have the cache line, at step 416. If the instruction cache 313 does not have the cache line then a cache invalidation request is not sent to the I-cache 313, at step 414. In this exemplary embodiment, the PSC XI includes the address to be invalidated. Otherwise, if the coherency logic 312 does not do such tracking, then the coherency logic 312 sends a PSC XI to the instruction cache 313 in response to the LSU 311 sending the exclusive fetch, at step 418.

Along with the PSC XI sent to the instruction cache 313, the coherency logic 312 sends an indication that the cache line is for PSC, along with the PSC tag assigned by the LSU 311, at step 520. The coherency logic 312 sends the PSC XI within a fixed maximum number of cycles before the cache line can be returned exclusively to LSU 311 and stored to by the data cache 318.

The instruction cache 313 maintains an instruction address table 320 containing addresses of pending instructions that have been fetched or prefetched by the processor. When the instruction cache 313 receives the cache invalidation request, which includes an address to be invalidated, the instruction cache 313 sends the address down a fast path to the instruction address table 314, bypassing the cache invalidation state machine 315, at step 522. The cache invalidation address is also sent to the cache invalidation state machine 315, such that the instruction cache can be invalidated later. Further fetches to the instruction cache using the same cache invalidation address are blocked until the pending cache invalidation actually occurs. Cache invalidation and blocking fetches to an address are well known.

When the PSC XI address reaches the instruction address table 314, its value is compared against all of the addresses fetched by the processor (i.e., the addresses stored in the table 314), at step 524.

If a match is not identified at step 526, then a miss is determined and an indictor of the miss is sent to the LSU to indicate that the address has not been prefetched and prefetched instructions do not need to be discarded, at step 528. The block of further fetches to the same address ensures that the line will not be prefetched from the instruction cache after a miss indication. At step 532, the cache invalidation is completed.

If the PSC XI address matches any of the fetched instruction addresses stored in the table 320 at step 526, a hit is determined and an indicator of the hit, as well as the PSC tag, are sent to the LSU 311, at step 530. The indicator is sent to the LSU 311 within a fixed maximum amount of time after the cache invalidation request is received from the coherency logic 312. The minimum amount of time from the cache invalidate request to the exclusive fetch data return use and the maximum amount of time from the cache invalidation request to the hit indication are accounted for such that any prefetched instructions following a store operation from the same store target line can be discarded. For example, if the minimum number of cycles from cache invalidate to exclusive fetch data return is 8 clock cycles, and prefetched instructions can be discarded following a store using the data return with an hit indication 2 cycles after the exclusive data return, then the maximum number of cycles from cache invalidate to hit indication is 10 cycles. Latch staging and other considerations may apply in order to meet these cycle targets. At step 532, the cache invalidation is completed.

Out-of-order execution can cause a problem in such an embodiment when there is a long time between when the store instruction is executed and when the store is completed. This is because the flush to discard the prefetched instructions normally occurs in the completion timeframe. Flushing only after completion is a standard convention to simplify the complexities of performing flushes for these stores. While waiting for a store instruction to the exclusively fetched line to complete, a LSU FAR resource must be maintained to detect any new store execution to the exclusively fetched line since the stores may be executed out-of-order, and architecturally a flush after the first completed store to this line is needed. Once the event that generates the exclusive fetch and allocates the LSU FAR gets a PSC indication from the ICache, there is no guarantee as to when a store will complete (or that a store to that line will complete at all). Also, reserving the FAR for PSC unnecessarily for long periods can be costly to performance because FARs are limited resources, especially if multiple PSC events eventually accumulate over a long period. Arbitrarily retiring a LSU FAR before it is known that all PSC tracking is done means that all executed stores from this point on must be treated as if they have PSC, because architecturally a PSC cannot be allowed to be missed. This may cause extra PSC events and pipeline flushes to be encountered for a single store that causes PSC, which is also costly to performance.

One embodiment of the present invention overcomes this problem by having the ICache inform the PSC tracking manager of the instruction line address that compared against the PSC XI (when a compare occurs) and by having the PSC tracking manager monitor if the instruction line addresses are still valid in the pipeline.

The PSC tracking manager 314 uses this information to determine if the LSU 311 should continue tracking PSC for a given line, and informs the LSU 311 accordingly. If the PSC tracking manager 314 informs the LSU 311 that PSC tracking is no longer required, the LSU 311 can retire the FAR such that it can be used for the next DCache miss. This embodiment allows the LSU 311 to only reserve FAR resources for PSC tracking for as long as they are truly needed in the out-of-order execution design and avoids the trade-offs of maintaining FARs for PSC tracking using some more arbitrary method when stores to the line do not complete in a timely manner.

Figure 6:
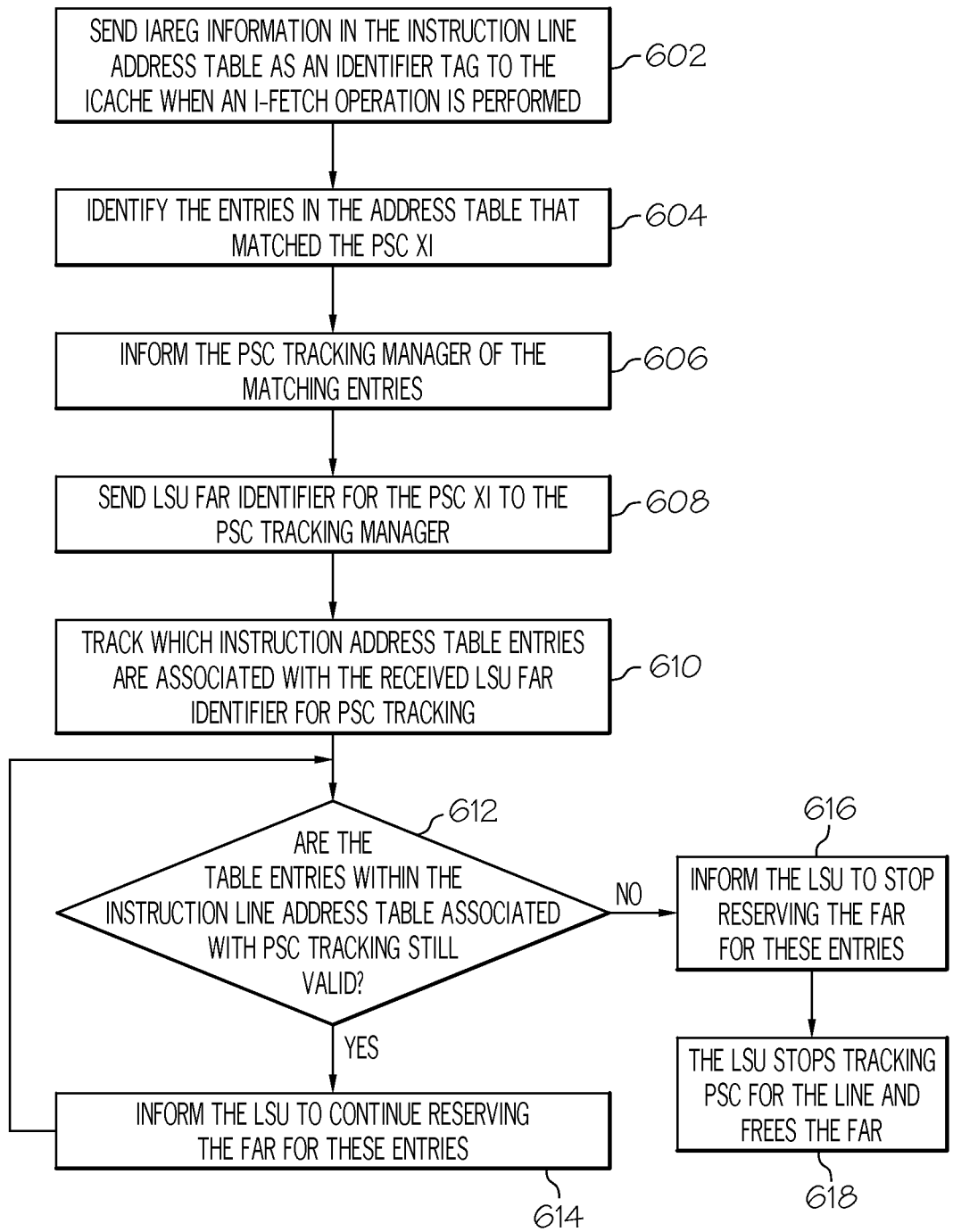
FIG. 6 is an operational flow diagram illustrating a process for managing cache coherency for self-modifying code in an out-of-order execution system according to one embodiment of the present invention.

FIG. 6 is an operational flow diagram illustrating a process for managing cache coherency for self-modifying code in an out-of-order execution system according to one embodiment of the present invention. In this embodiment, the ICache 311 and the PSC tracking manager 314 within the IFU 316 are both aware of the same table 318 of instruction line addresses (with a 1:1 mapping). This mapping is possible because the PSC tracking manager 314 passes the IAReg information in the instruction line address table 321 as an identifier tag to the ICache 313 when the IFU 316 performs an I-Fetch operation, at step 602. Therefore, the IFU 316 and the ICache 313 have a 1:1 mapping when the ICache 313 installs an address for the entry.

After a PSC XI is compared against the address in the instruction table 320, the ICache 311 identifies the matching entries, at step 604. The ICache 311 informs the PSC tracking manager 314 as to which entries (with multiple entries being able to reference the same line address) in the address table 320 matched the PSC XI, at step 606. The ICache 311 also sends the LSU FAR number for the PSC XI to the PSC tracking manager 314 that the ICache 311 received from the cache coherency logic 312, at step 608.

The PSC tracking manager 314 then tracks which instruction address table entries are associated with this LSU FAR for PSC tracking, at step 610. In this embodiment, the LSU 311 sends to the L2 the LSU FAR that is associated with its request sent to the L2 (to get the line exclusive). Then, the L2 forwards this LSU FAR information to the ICache 313 along with the PSC XI. The ICache 313 then forwards the LSU FAR to the PSC tracking manager 314 along with its indications of which IAReg entries compared to the PSC XI, as explained above. Therefore, the LSU FAR identifier is associated with the IAReg entries in the address table 320 that compared against the PSC XI. Each instruction fetch is associated with an IAReg and each instruction is associated with one or two instruction fetches (an instruction can span two instruction fetches). Accordingly, each instruction is associated with one or two IARegs that can each be associated with one or more PSC detections/compares and LSU FAR.

While the table entries within the instruction line address table 321 are still valid at step 612 (meaning they are still being used in the pipeline), the PSC tracking manager 314 informs the LSU 311 that the FAR must still be reserved for PSC tracking, at step 614. When all instruction address table entries have become invalid for the LSU FAR at step 612, the PSC tracking manager 314 informs the LSU 311 that the FAR no longer needs to be reserved PSC tracking, at step 616. The LSU 311 then stops tracking PSC for the line and frees the FAR, at step 618.

In this embodiment, the PSC tracking manager 314 determines if table entries within the instruction line address table 321 are valid or invalid by utilizing the data received from the ICache 313 to track the instructions, instruction fetches, and their associated IARegs that have been sent to the rest of the core. Utilizing the completion logic and IFetch logic, the PSC tracking manager 314 determines if all of the instructions for a given IAReg (and line) have been completed and if instructions for other IARegs and lines are being completed. If all of the instructions for a given IAReg have been completed (and the IFU 316 is not sending any more instructions for that IAReg into the core), then the IAReg can be retired.

This mechanism can be applied to multiple LSU FARs and PSC events independently and simultaneously. Also, this method works naturally both when a store with PSC does complete (the flush will cause the instruction address table entry to invalidate) or when there is never a store that completes for that address (normal instruction completion will eventually cause no instructions to be in the pipeline for that line and the instruction address table entry will invalidate).

Accordingly, the arbitrary method of forcing flushes to free PSC tracking resources based on time or the timing of events unrelated to PSC resolution is eliminated. Embodiments of the present invention configure the ICache and IFetch logic to send information to the load-store-unit (LSU) about the existence (or lack of existence) of instructions in the pipeline that were fetched from the line where PSC was detected. The LSU only needs to continue to track PSC and reserve the tracking resources as long as the IFetch informs the LSU that instructions from this line are still in the pipeline. When all of the instructions from this line are removed from the pipeline (either by instruction completion or pipeline flush or a combination of both), the LSU no longer needs to track PSC for this line and can free its tracking resource.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A computer-implemented method for managing cache coherency for self-modifying code in an out-of-order execution system having a separate first level instruction cache (I-Cache) and first level data cache (D-Cache), the out-of-order execution system executing a plurality of instructions in an execution pipeline, the method comprising:
    processing, by a load store unit (LSU), a store operation of a to-be-stored operand of an instruction being executed, wherein the LSU is configured to perform loads from the D-Cache and stores to the D-Cache of operands of instructions being executed, wherein the to-be-stored operand is to be stored at an operand address;
    determining, by the LSU, whether a store target cache line associated with the to-be-stored operand is currently exclusive in the D-Cache;
    sending, by the LSU, a request for an exclusive ownership of the store target cache line based on the store target cache line failing to be exclusively owned by the D-Cache, wherein the request initiates a retrieval of the store target cache line into the D-Cache;
    reserving, by the LSU based on the sending, a program-store-compare (PSC) tracking resource comprising a fetch address register (FAR) maintained within the LSU, the FAR comprising the operand address;
    releasing, by the LSU, the reserved PSC tracking resource, based on determining, by a PSC tracking manager, that instruction addresses of instructions being executed in the execution pipeline do not match the operand address in the FAR; and
    maintaining by the LSU, the reserved PSC tracking resource, based on determining, by a PSC tracking manager, that instruction addresses of instructions being executed in the execution pipeline match the operand address in the FAR.

2. The method according to claim 1, wherein a first address of a first instruction being executed in the pipeline, causes the maintaining, and the first instruction being completed causing the releasing.

3. The method according to claim 1, wherein the to-be-stored operand is stored and the PSC tracking resource is maintained until the execution pipeline is flushed of instructions including and following, in program order, instructions in the store target cache line.

4. The method of claim 1, wherein the PSC tracking manager resides within an instruction fetch unit of a processor.

5. The method of claim 1, wherein the instruction addresses of the instructions being executed in the execution pipeline are stored within an instruction line address table of an instruction fetch unit.

6. The method of claim 1, further comprising:
    based on an instruction fetch unit performing an instruction fetch operation, sending, by the PSC tracking manager, a set of instruction address registration information in an instruction line address table within the instruction fetch unit to the I-Cache as an identifier tag, wherein the identifier tag creates a 1:1 mapping between the I-Cache and the instruction fetch unit with respect to the instruction line address table.

7. The method of claim 1, further comprising:
    determining, by the LSU, that the store target cache line is not exclusive in the D Cache;
    allocating, by the LSU, a PSC tag based on determining that the store target cache line is not exclusive; and
    sending the PSC tag and the request to coherency logic.

8. The method of claim 7, further comprising:
    sending, by the coherency logic, a cache invalidation request to the I-Cache, the cache invalidation request including an address to be invalidated, the PSC tag, and an indicator specifying that the cache invalidation request is for a PSC operation.

9. The method of claim 8, further comprising:
    comparing, by the I Cache, the address requested to be invalidated with the address table; and
    identifying a set of addresses in the address table that match the address requested to be invalidated.

10. A system for managing cache coherency for self-modifying code, the system comprising:
    a memory; and
    a processor communicatively coupled to the memory, the processor comprising:
        an out-of-order execution system comprising a separate first level instruction cache (I-Cache) and first level data cache (D-Cache), the out-of-order execution system configured to execute a plurality of instructions in an execution pipeline, the out-of-order execution system further comprising a load store unit (LSU) configured to perform loads from the D-Cache and stores to the D-Cache of operands of instructions being executed, and wherein the LSU is further configured to perform a method comprising:
            processing a store operation of a to-be-stored operand of an instruction being executed, wherein the to-be-stored operand is to be stored at an operand address;

determining whether a store target cache line associated with the to-be-stored operand is currently exclusive in the D-Cache;

sending a request for an exclusive ownership of the store target cache line based on the store target cache line failing to be exclusively owned by the D-Cache, wherein the request initiates a retrieval of the store target cache line into the D-Cache;

reserving, based on the sending, a program-store-compare (PSC) tracking resource comprising a fetch address register (FAR) maintained within the LSU, the FAR comprising the operand address;

releasing the reserved PSC tracking resource, based on determining, by a PSC tracking manager, that instruction addresses of instructions being executed in the execution pipeline do not match the operand address in the FAR; and maintaining the reserved PSC tracking resource, based on determining, by a PSC tracking manager, that instruction addresses of instructions being executed in the execution pipeline match the operand address in the FAR.

11. The system of claim 10, wherein the PSC tracking manager resides within an instruction fetch unit of the processor.

12. The system of claim 10, wherein the instruction addresses of the instructions being executed in the execution pipeline are stored within an instruction fetch unit.

13. The system of claim 10, wherein the method further comprises:
   determining that the store target cache line is not exclusive in the D Cache;
   allocating a PSC tag based on determining that the store target cache line is not exclusive; and
   sending the PSC tag and the the store target cache line to coherency logic.

14. The system of claim 13, wherein the coherency logic is configured to:
   send a cache invalidation request to the I Cache, the cache invalidation request including an address to be invalidated, the PSC tag, and an indicator specifying that the cache invalidation request is for a PSC operation.

15. A computer program product for managing cache coherency for self-modifying code in an out-of-order execution system having a separate first level instruction cache (I-Cache) and first level data cache (D-Cache), the out-of-order execution system executing a plurality of instructions in an execution pipeline, the computer program product comprising:
   a non-transitory storage medium readable by a processing circuit and storing instructions for execution by the processing circuit for performing a method comprising:
      processing, by a load store unit (LSU), a store operation of a to-be-stored operand of an instruction being executed, wherein the LSU is configured to perform loads from the D-Cache and stores to the D-Cache of operands of instructions being executed, wherein the to-be-stored operand is to be stored at an operand address;
      determining, by the LSU, whether a store target cache line associated with the to-be-stored operand is currently exclusive in the D-Cache;
      sending, by the LSU, a request for an exclusive ownership of the store target cache line based on the store target cache line failing to be exclusively owned by the D-Cache, wherein the request initiates a retrieval of the store target cache line into the D-Cache;
      reserving, by the LSU based on the sending, a program-store-compare (PSC) tracking resource comprising a fetch address register (FAR) maintained within the LSU, the FAR comprising the operand address;
      releasing, by the LSU, the reserved PSC tracking resource, based on determining, by a PSC tracking manager, that instruction addresses of instructions being executed in the execution pipeline do not match the operand address in the FAR; and
      maintaining by the LSU, the reserved PSC tracking resource, based on determining, by a PSC tracking manager, that instruction addresses of instructions being executed in the execution pipeline match the operand address in the FAR.

16. The non-transitory computer program product of claim 15, wherein the instruction addresses of the instructions being executed in the execution pipeline are stored within an address table of the I-Cache.

17. The non-transitory computer program product of claim 15, further comprising:
   based on an instruction fetch unit performing an instruction fetch operation, sending, by the PSC tracking manager, a set of instruction address registration information in an instruction line address table within the instruction fetch unit to the I Cache as an identifier tag, wherein the identifier tag creates a 1:1 mapping between the I-Cache and the instruction fetch unit with respect to the instruction line address table.

18. The non-transitory computer program product of claim 15, further comprising:
   determining, by the LSU, that the store target cache line is not exclusive in the D Cache;
   allocating, by the LSU, a PSC tag based on determining that the store target cache line is not exclusive; and
   sending the PSC tag and the request to coherency logic.

19. The non-transitory computer program product of claim 18, wherein the method further comprises:
   sending, by the coherency logic, a cache invalidation request to the I-Cache, the cache invalidation request including an address to be invalidated, the PSC tag, and an indicator specifying that the cache invalidation request is for a PSC operation.

20. The non-transitory computer program product of claim 19, further comprising:
   comparing, by the I Cache, the address requested to be invalidated with the address table; and
   identifying a set of addresses in the address table that match the address requested to be invalidated.

* * * * *